United States Patent [19]

Dieck et al.

[11] 4,055,523
[45] Oct. 25, 1977

[54] POLY(DIALKYLAMINOARYLOXYPHOSPHAZENE) POLYMERS AND FOAMS

[75] Inventors: Ronald L. Dieck; Alan B. Magnusson; Edwin J. Quinn, all of Lancaster, Pa.

[73] Assignee: Armstrong Cork Company, Lancaster, Pa.

[21] Appl. No.: 714,526

[22] Filed: Aug. 16, 1976

[51] Int. Cl.$^2$ ............................................. C08G 79/02
[52] U.S. Cl. ........................... 260/2.5 R; 260/2.5 FP; 260/25.2 R; 260/30.4 N; 260/32.6 N; 260/33.6 R; 260/37 N; 260/47 R; 260/47 P; 260/DIG. 24
[58] Field of Search ................. 260/47 P, 2.5 R, 47 R, 260/2.5 FP

[56] References Cited

U.S. PATENT DOCUMENTS

| | | | |
|---|---|---|---|
| 2,866,773 | 12/1958 | Redfarn | 260/47 |
| 3,313,774 | 4/1967 | Rice et al. | 260/47 |
| 3,370,020 | 2/1968 | Allcock et al. | 260/2 |

Primary Examiner—Lester L. Lee
Attorney, Agent, or Firm—Richard J. Hammond

[57] ABSTRACT

Poly(aryloxyphosphazene) polymers and foams thereof having di($C_1$–$C_{10}$)alkylaminophenoxy groups are described. The polymers consist of the units which occur in a nonregular fashion and are represented by the following general formula:

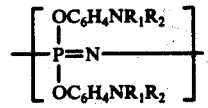

wherein $R_1$ and $R_2$ are the same or different and are $C_1$–$C_{10}$ linear or branched alkyl radical. Copolymeric dialkylaminoaryloxy-aryloxyphosphazenes are disclosed represented by units of the general formula:

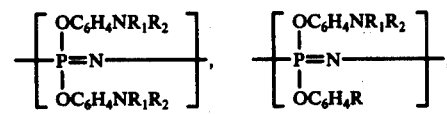

and 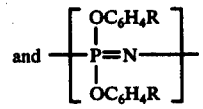

wherein $R_1$ and $R_2$ are defined above and R represents hydrogen, halogen, $C_1$–$C_{10}$ linear or branched alkyl radical, or $C_1$–$C_4$ linear or branched alkoxy radical substituted on any sterically permissible position on the other phenoxy group. The radical $NR_1R_2$ is substituted in the meta or para position on the phenoxy radical. The polymers are elastomers, have desirable tensile strengths and may be used to form flexible or semi-rigid films, sheets, and foams. The polymers are extremely fire retardant and produce low smoke loads when heated in an open flame. They readily form salts with mineral acids that are water soluble.

19 Claims, No Drawings

POLY(DIALKYLAMINOARYLOXYPHOSPHAZENE) POLYMERS AND FOAMS

DESCRIPTION OF THE INVENTION

This invention relates to elastomeric poly(dialkylaminoaryloxyaryloxyphosphazene) polymer, to flexible and semi-rigid foams produced from said polymers, and to a process for preparing said polymers and foams. The polymers of this invention are soluble in tetrahydrofuran, benzene and dimethylformamide and exhibit excellent flame retardant and film-forming properties. The corresponding amine salts formed by reacting these polymers with strong acids such as hydrochloric acid, sulfuric acid, and the like, are water soluble. Foams prepared from the polymers exhibit excellent flame retardant properties and produce low smoke levels when heated in an open flame. All of the polymers described may be crosslinked at moderate temperatues in the presence of free radical initiators so as to modify their properties and expand their field of use.

The preparation of poly(aryloxyphosphazene) polymers has been disclosed in U.S. Pat. No. 3,856,712 to Reynard et al, U.S. Pat, No. 3,856,713 to Rose el al, and U.S. Pat. No. 3,883,451 to Reynard et al. However, in contrast to the polymers of the present invention, the polymers described in the first-mentioned Reynard et al patent contain selected quantities of both alkoxy and aryloxy side chains in the polymer backbone, whereas the polymers described in the latter-mentioned Reynard et al patent are characterized by the presence of halogen-substituted aryl side chains in the polymer backbone. The polymers disclosed in the above-mentioned Rose et al patent also differ from the polymers of the present invention since they are characterized by the presence of only aryloxy and alkyl-substituted aryloxy side chains. Other related art may be found in U.S. Pat. Nos. 3,515,688; 3,700,629; 3,702,833; and 3,856,712, but in each case, the polymers described in these patents differ from the polymers of this invention in their structure and physical characteristics.

Poly(dialkylaminoaryloxy) homopolymers of this invention are characterized by repeating units of the general formula:

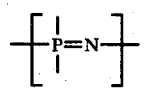

which contain dialkyaminoaryloxy substituents (peferably substituted in the para position) on the phosphorous atoms in a nonregular fashion and which can be represented by the following formula:

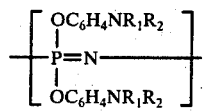

where aryloxy substituents are present, e.g., in copolymers, phosphazenes are formed having the following formulas:

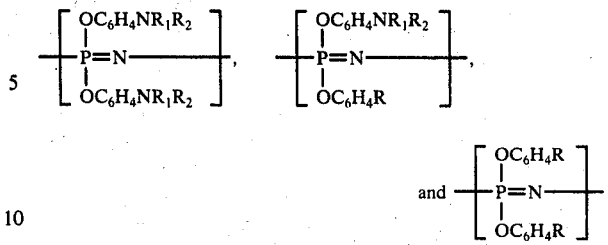

wherein $R_1$ and $R_2$ are the same or different and are $C_1$–$C_{10}$ linear or branched alkyl radical, and R is hydrogen, halogen, $C_1$–$C_{10}$ linear or branched alkyl radical or $C_1$–$C_4$ linear or branched alkoxy radical, substituted in any sterically permissible position on a phenoxy group and the radical —$NR_1R_2$ is substituted in the meta or para position in the other phenoxy group. Examples of $R_1$ and $R_2$ include methyl, ethyl, propyl, isopropyl, n-butyl, isobutly, hexyl, and dodecyl. Examples of R include methyl, ethyl, n-propyl, isopropyl, n-butyl, sec-butyl, tert-butyl, fluoro, chloro, bromo, iodo, methoxy, ethoxy, propoxy, n-butoxy and the like.

It is to be understood that while it is presently preferred that all $R_1$'s and all $R_2$'s are the same, $R_1$ and $R_2$ can be mixed. The mixtures may be mixtures of different alkyl radicals on the nitrogen atom, mixtures of different dialkylamines throughout the phosphazene polymer, or mixtures of these two mixtures. Further, the position of these amines may be varied on the phenoxy nucleus to give mixtures of different meta- and para-alkylamine isomers. One skilled in the art readily will recognize that steric hindrance will dictate the propriety of using relatively bulky groups in the para position on the phenoxy ring since, as set forth hereinafter, the polymers are made by reacting a substituted metal phenoxide with a chlorine atom on a phosphorous atom. Desirably, groups which sterically inhibit this reaction should be avoided. Absent the foregoing proviso, the selection of the various $R_1$'s and $R_2$'s will be apparent to anyone skilled in the art based upon this disclosure.

For the sake of simplicity, the polymers of the invention may be represented by the formula $[NP(OC_6H_4—NR_1R_2)_x(OC_6H_4—R)_y]_n$ wherein $n$ is from about 20 to about 2000 or more, and wherein $x$ is greater than zero, $y$ is $>0$. When $y$ is greater than 0, $x + y = 2$.

It should be understood that while this formula represents a homopolymer or copolymer, this invention also encompasses poly(aryloxyphosphazenes) that are ter-polymers; for example, in cases as mentioned above where $R_1$ and $R_2$ are mixed and/or where the position of $R_1R_2N$ is mixed. In addition, the substituent R can also be mixed to yield a polymer of the formula $[NP(OC_6H_4—NR_1R_2)_x((OC_6H_4—R')(OC_6H_4—R''))_y]_n$ where R' and R'' are different and are R as defined above with $R_1$, $R_2$, $x$, $y$ and $n$ as disclosed above.

These polymers are capable of further reaction at moderate temperatures (for example, 200°–350° F.) in the presence of free radical initiators, conventional curing or vulcanizing additives known in the rubber art or other reagents, often even in the absence of accelerators, using conventional amounts, techniques and processing equipment.

Examples of free radical initiators include benzoyl peroxide, bis(2,4-dichlorobenzoyl peroxide), di-tert-butyl peroxide, dicumyl peroxide, 2,5-dimethyl(2,5-di-tert-butylperoxy)hexane, t-butyl perbenzoate, 2,5- dimethyl-2,5-di(tert-butyl peroxy)heptene-3, and 1,1-bis(tert-butylperoxy) -3,3,5-trimethylcyclohexane. Thus, the general peroxide classes which may be used for crosslinking include diacyl peroxides, peroxyesters, and dialkyl peroxides.

In general, the processability, smoke production, glass transition temperature and other physical properties are affected by the identity of R, $R_1$ and $R_2$ and the amounts of these species in the phosphazene polymers. Thus, in homopolymers or copolymers comprising only the radical $-NR_1R_2$, by increasing the size of $R_1$ and/or $R_2$ or moving $-NR_1R_2$ from the meta to para position on the aryloxy ring, a decrease in open flame smoke generation occurs, with a concurrent increase in flammability. However, these changes cause more flexible films and enhanced foamability. When $NR_1R_2$ is constant and R is included in the phosphazene polymer, the ratios of x:y become a feature that then is important in physical property considerations. In the polyphosphazenes of this type, an increase in the mole percent of R as alkoxy, for example, decreases the amount of smoke generated from the polymers subjected to an open flame. Further, as smaller amounts of $-NR_1R_2$ are present in the polymers having any R radical, their crystallinity increases to such an extent that their ability to be foamed is diminished. Of course, as smaller amounts of R are present, the behavior of the polymers approach that of the 100% $-NR_1R_2$-containing materials. Preferred polymers in accordance with the present invention are those containing both $-NR_1R_2$ and R radicals. In such case, the mole ratio of x:y is preferably at least about 1:6 and up to about 6:1, most preferably between about 1:4 and 4:1.

In one embodiment, the polymers of this invention may be prepared in accordance with the process described in U.S. Pat. No. 3,370,020 to Allcock et al, which description is incorporated herein by reference. Accordingly, the polymers of this invention may be prepared by a multi-step process wherein the first step comprises thermally polymerizing a compound having the formula $$(NPCl_2)_3$$

by heating it at a temperature and for a length of time ranging from about 200° C. for 48 hours to 300° C. for 30 minutes, preferably in the absence of oxygen, and most preferably in the presence of a vacuum of at least $10^{-1}$ Torr. That is to say, the compounds are heated to a temperature ranging from about 200° C. to about 300° C. for from about 30 minutes to 48 hours, the higher temperatures necessitating shorter contact times and the lower temperatures necessitating longer contact times. The compounds must be heated for such a length of time that only a minor amount of unreacted charge material remains and a major amount of high polymer has been produced. Such a result is generally achieved by following the conditions of temperature and contact time specified above.

It is preferred that the thermal polymerization be carried out in the presence of an inert gas such as nitrogen, neon, argon or a vacuum, e.g., less than about $10^{-1}$ Torr inasmuch as the reaction proceeds very slowly in the presence of air. The use of such a gas, however, is not critical.

The polymers resulting from the thermal polymerization portion of the process are in the form of a polymeric mixture of different polymers of different chain lengths. That is to say, the product of the thermal polymerization is a mixture of polymers having the formula $$-(NPCl_2)_n$$

wherein $n$ ranges from about 20 to about 2000. For example, the recovered media may contain minor amounts of a polymer where $n$ is 20 and major amounts of polymer where $n$ is 2000. The media may also contain polymers composed of from 21-1999 recurring units and some unreacted trimer. The complete mixture of polymers and unreacted trimer constitutes the charge to the second step of the process.

The second or esterification step of the process comprises treating the mixture resulting from the thermal polymerization step with a compound having the formula $$M(OC_6H_4-NR_1R_2)_z,$$

$$M(OC_6H_4-R)_z,$$

or mixtures thereof wherein M is lithium, sodium, potassium, magnesium or calcium, z is equal to the valence of metal M, and R, $R_1$ and $R_2$ are as specified above.

The polymer mixture is reacted with alkali or alkaline earth metal compound(s) at a temperature ranging from about 25° C. to about 200° C. for from about 3 hours to about 7 days, the lower temperatures necessitating the longer reaction times and the higher temperatures allowing shorter reaction times. These conditions are, of course, utilized in order to obtain the most complete reaction possible, i.e., in order to insure the complete conversion of the chlorine atoms in the polymer mixture to the corresponding ester of the alkali or alkaline earth starting materials.

The above esterification step is carried out in the presence of a solvent. The solvent employed in the esterification step must have a relatively high boiling point (e.g. about 115° C., or higher) and should be a solvent for both the polymer and the alkali or alkaline earth metal compound(s). In addition, the solvent must be substantially anhydrous, i.e., there must be no more water in the solvent or metal compounds than will result in more than 1%, by weight, of water in the reaction mixture. The prevention of water in the system is necessary in order to inhibit the reaction of the available chlorine atoms in the polymer therewith. Examples of suitable solvents include diglyme, triglyme, tetraglyme, toluene and xylene. The amount of solvent employed is not critical and any amount sufficient to solubilize the chloride polymer mixture can be employed. Either the polymer mixture or the alkaline earth (or alkali) metal compound or compounds may be used as a solvent solution thereof in an inert, organic solvent. It is preferred, however, that at least one of the charge materials be used as a solution in a compound which is a solvent for the polymeric mixture.

The combined amount of the alkali metal or alkaline earth metal compound or compounds employed should be at least molecularly equivalent to the number of available chlorine atoms in the polymer mixture. However, it is preferred that an excess of the metal compounds be employed in order to assure complete reaction of all the available chlorine atoms. Generally, the ratio of the individual alkali metal or alkaline earth metal compounds in the combined mixture governs the ratio of the groups attached to the polymer backbone. However, those skilled in the art readily will appreciate that the nature and, more particularly, the steric configuration of the metal compounds employed may affect their relative reactivity. Accordingly, the ratio of R's, $R_1$'s and $R_2$'s in the esterified product, if necessary, may be controlled by employing a stoichiometric excess of the slower reacting metal compound.

Examples of alkali or alkaline earth metal compounds which are useful in the process of the present invention include:

sodium phenoxide
potassium phenoxide
sodium p-methoxyphenoxide
sodium o-methoxyphenoxide
sodium m-methoxyphenoxide
lithium p-methoxyphenoxide
lithium o-methoxyphenoxide
lithium m-methoxyphenoxide
potassium p-methoxyphenoxide
potassium o-methoxyphenoxide
potassium m-methoxyphenoxide
magnesium p-methoxyphenoxide
magnesium o-methoxyphenoxide
magnesium m-methoxyphenoxide
calcium p-methoxyphenoxide
calcium o-methoxyphenoxide
calcium m-methoxyphenoxide
sodium p-ethoxyphenoxide
sodium o-ethoxyphenoxide
sodium m-ethoxyphenoxide
potassium p-ethoxyphenoxide
potassium o-ethoxyphenoxide
potassium m-ethoxyphenoxide
sodium p-n-butyoxyphenoxide
sodium m-n-butoxyphenoxide
lithium p-n-butoxyphenoxide
lithium m-n-butoxyphenoxide
potassium p-n-butoxyphenoxide
potassium m-n-butoxyphenoxide
magnesium p-n-butoxyphenoxide
magnesium m-n-butoxyphenoxide
calcium p-n-butoxyphenoxide
calcium m-n-butoxyphenoxide
sodium p-n-propoxyphenoxide
sodium o-n-propoxyphenoxide
sodium m-n-propoxyphenoxide
potassium p-n-propoxyphenoxide
potassium o-n-propoxyphenoxide
potassium m-n-propoxyphenoxide
sodium p-methylphenoxide
sodium o-methylphenoxide
sodium m-methylphenoxide
lithium p-methylphenoxide
lithium o-methylphenoxide
lithium m-methylphenoxide
sodium p-ethylphenoxide
sodium o-ethylphenoxide
sodium m-methylphenoxide
potassium p-n-propylphenoxide
potassium o-n-propylphenoxide
potassium m-n-propylphenoxide
magnesium p-n-propylphenoxide
sodium p-isopropylphenoxide
sodium o-isopropylphenoxide
sodium m-isopropylphenoxide
calcium p-isopropylphenoxide
calcium o-isopropylphenoxide
calcium m-isopropylphenoxide
sodium p-sec butylphenoxide
sodium m-sec butylphenoxide
lithium p-sec butylphenoxide
lithium m-sec butylphenoxide
lithium p-tert. butylphenoxide
lithium m-tert. butylphenoxide
potassium p-tert. butylphenoxide
potassium m-tert. butylphenoxide
sodium p-tert. butylphenoxide
sodium m-tert. butylphenoxide
sodium p-nonylphenoxide
sodium m-nonylphenoxide
sodium o-nonylphenoxide
sodium m-dimethylaminophenoxide.
potassium m-dimethylaminophenoxide
lithium m-dimethylaminophenoxide
sodium p-dimethylaminophenoxide
calcium p-dimethylaminophenoxide
lithium m-diethylaminophenoxide
sodium m-diethylaminophenoxide
potassium p-diethylaminophenoxide
lithium p-dipropylaminophenoxide
sodium p-methylethylaminophenoxide
potassium m-methylethylaminophenoxide,
and the like.

The second step of the process results in the production of a polymer mixture having the formula

$$[NP(OC_6H_4NR_1R_2)_x(OC_6H_4R)_y]_n$$

wherein $n$, $R_1$, $R_2$, $x$ and $y$ are as specified earlier, and the corresponding metal chloride salt.

The polymeric reaction mixture resulting from the second or esterification step is then treated to remove the salt which results upon reaction of the chlorine atoms of the copolymer mixture with the metal of the alkali or alkaline earth metal compounds. The salt can be removed by merely precipitating it out and filtering, or it may be removed by any other applicable method, such as by washing the reaction mixture with water.

The next step in the process comprises fractionally precipitating the polymeric material to separate out the high polymer from the low polymer and any unreacted trimer. The fractional precipitation is achieved by the, preferably dropwise, addition of the esterified polymer mixture to a material which is a non-solvent for the high polymer and a solvent for the low polymer and unreacted trimer. That is to say, any material which is a non-solvent for the polymers wherein n is higher than 350 and a solvent for the remaining low polymers may be used to fractionally precipitate the desired polymers. Examples of materials which can be used for this purpose include hexane, diethyl ether, carbon tetrachloride, chloroform, dioxane, methanol, water and the like. The fractional precipitation of the esterified polymeric mixture generally should be carried out at least twice and preferably at least four times in order to remove as much of the low polymer from the polymer mixture as possible. The precipitation may be conducted at any temperature, however, it is preferred that room temperature be employed. The novel high molecular weight polymer mixture may then be recovered by filtration, centrifugation, decantation or the like.

The novel polymeric mixtures of this invention, as mentioned above, are very thermally stable. The mixtures are soluble in specific organic solvents such as tetrahydrofuran, benzene, xylene, toluene, dimethylformamide and the like and can be formed into films from solutions of the polymers by evaporation of the solvent. The polymers are water resistant at room temperature and do not undergo hydrolysis at high temperatures. The polymers may be used to prepare films, fibers, coatings, molding compositions and the like. They may be blended with such additives as antioxidants, ultraviolet light absorbers, lubricants, plasticizers, dyes, pigments, fillers such as litharge, magnesia, calcium carbonate, furnace black, alumina trihydrate and hydrated silicas, other resins, etc., without detracting from the scope of the present invention.

In addition to the excellent solubility in organic solvents of the polymers in accordance with the present invention, these phosphazenes can also be dissolved in water by converting them to their corresponding acid salts. For example, the homopolymeric and copolymeric aminoaryloxyphosaphazene polymers of this invention are readily dissolved in a 5% aqueous solution of hydrochloric acid. The polymers, as separated from the esterification reaction, may be used directly to form the acid salt or, if desired, the fractionally precipitated phosphazenes may be used. Conveniently, the polymers are first dissolved in a suitable, water soluble solvent before being converted to their corresponding salts. Addition of a dilute solution of acid, e.g., nitric, hydrochloric or sulfuric acids, forms the acid salts. Conversion back to the free amine is accomplished by neutralization of the aqueous solutions of these salts with base. The conversion of organic amines to amine salts and back to the free amine is well known in the prior art. Homopolymeric dialkylaminoaryloxyphosphazenes form these acid salts as readily as do the copolymers. However, a dialkylaminoaryloxyphosphazene segment content of the polymers of about 10%, preferbly 20%, is necessary to effect facile water solubility of the acid salts, e.g., x:y of 1:9.

The polymers may be used to prepare foamed products which exhibit excellent fire retardance and which produce low smoke levels, or essentially no smoke when heated in an open flame. The foamed products may be prepared from filled or unfilled formulations using conventional foam techniques with chemical blowing agents, i.e. chemical compounds stable at original room temperature which decompose or interact at elevated temperatures to provide a cellular foam. Suitable chemical blowing agents include:

| Blowing Agent | Effective Temperature Range ° C. |
|---|---|
| Azobisisobutyronitrile | 105-120 |
| Azo dicarbonamide(1,1-azobisformamide) | 100-200 |
| Benzenesulfonyl hydrazide | 95-100 |
| N,N'-dinitroso-N,N'-dimethyl terephthalamide | 100 |
| Dinitrosopentamethylenetetramine | 130-150 |
| Ammonium carbonate | 58 |
| p,p'-oxybis-(benzenesulfonyl-hydrazide) | 100-200 |
| Diazo aminobenzene | 84 |
| Urea-biuret mixture | 90-140 |
| 2,2'-azo-isobutyronitrile | 90-140 |
| Azo hexahydrobenzonitrile | 90-140 |
| Diisobutylene | 103 |
| 4,4'-diphenyl disulfonylazide | 110-130 |

Typical foamable formulations include:

| | |
|---|---|
| Phosphazene polymer | 100 parts |
| Filler (e.g., alumina trihydrate) | 0-100 phr |
| Stabilizer (e.g., magnesium oxide) | 2.5-10 phr |
| Processing aid (e.g., zinc stearate) | 2.5-10 phr |
| Plasticizer resin (e.g., Cumar P-10, coumarone indene resin) | 0-50 phr |
| Blowing agent (e.g., 1,1'-azobisformamide) | 10-50 phr |
| Activator (e.g., oil-treated urea) | 10-40 phr |
| Peroxide curing agent (e.g., 2,5-dimethyl-2,5-di(t-butylperoxy) hexane) | 2.5-10 phr |
| Peroxide curing agent (e.g., benzoyl peroxide) | 2.5-10 phr |

While the above are preferred formulation guidelines, obviously some or all of the adjuvants may be omitted, replaced by other functionally equivalent materials, or the proportions varied, within the skill of the art of the foam formulator.

In one suitable process, the foamable ingredients are blended together to form a homogeneous mass; for example, a homogenous film or sheet can be formed on a 2-roller mill, preferably with one roll at ambient temperature and the other at moderately elevated temperature, for example 100°–120° F. The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,5-dimethyl-2,5-di(t-butylperoxy)hexane, and partially pre-curing in a closed mold for about 6–30 minutes at 200°–250° F., followed by free expansion for 30–60 minutes at 300°–350° C. In the alternative, the foaming may be accomplished by heating the foamable mass for 30–60 minutes at 300°–350° F. using a high temperature or low temperature curing agent, either singly or in combination. One benefit of utilizing the "partial pre-cure" foaming technique is that an increase in the molecular weight of the foamable polymer prior to the foaming step enables better control of pore size and pore uniformity in the foaming step. The extent of "pre-cure" desired is dependent upon the ultimate foam characteristics desired. The desired foaming temperature is dependent on the nature of the blowing agent and the crosslinkers present. The time of heating is dependent on the size and shape of the mass being foamed. The resultant foams are generally light tan to dark brown in appearance, and vary from flexible to semi-rigid, depending upon the glass transition temperature of the copolymer employed in the foam formulation, that is to say, the lower the glass transition of the copolymer the more flexible will be the foam produced therefrom. As indicated, inert, reinforcing or other fillers such as alumina trihydrate, hydrated silicas or calcium carbonate can be added to the copolymer foams and the presence of these and other conventional additives should in no way be construed as falling outside the scope of this invention.

Also, as mentioned above, the polymers of this invention can be crosslinked at moderate temperatures by conventional free radical initiators. The ability of these polymers to be cured at temperatures below about 350° F. makes them particularly useful as potting and encapsulation compounds, sealants, coatings and the like. These copolymers are also useful for preparing crosslinked foams which exhibit significantly increased tensile strengths over uncured foams. These copolymers are often crosslinked in the presence of inert, reinforcing or other fillers and the presence of these and other conventional additives are deemed to be within the scope of this invention.

The following examples are set forth for purposes of illustration only and are not to be construed as limitations for the present invention except as set forth in the appended claims. All parts and percentages are by weight unless otherwise indicated.

EXAMPLE 1

Preparation of $(NPCl_2)_n$ 250 parts of phosphonitrilic chloride trimer, previously recrystallized from n-heptane, were degassed and sealed in a suitable, thick-walled reaction vessel at $10^{-2}$ Torr and heated to 250° C. for 6 hours. Polymerization was terminated at this time since a glass ball, one-half inch in diameter ceased to flow due to the increased viscosity of the molten mass, when the vessel was inverted. Termination was effected by cooling the vessel to room temperature. The resulting polymeric mixture was then dissolved in toluene to form an anhydrous solution.

EXAMPLE 2

Preparation of $[NP(OC_6H_4-3-N(C_2H_5)_2)_2]_n$

The anhydrous toluene solution of poly(dichlorophosphazene) formed in Example 1, containing 0.47 equivalents of poly(dichlorophosphazene), was added to an anhydrous diglyme-benzene solution of 1.10 equivalents of $NaOC_6H_4-3-N(C_2H_5)_2$ at a temperature of 95° C. with constant stirring. After the addition, benzene was distilled from the reaction mixture until a temperature of 115°–116° C. was attained. The reaction was then heated at reflux for 50–65 hours. At the end of this time the homopolymer was precipitate by pouring the reaction mixture into excess methyl alcohol. The polymer was stirred in methyl alcohol for 24 hours. Next, it was added to a large excess of water and stirred for an additional 24 hours. The resulting product (43 percent yield) was an off-white plastic material having a glass transistion temperature of $-7.1°$ C. The product was soluble in benzene, toluene, tetrahydrofuran, and dimethylformamide. The polymer was then pressed into a tough film which did not burn and was water repellant. The homopolymer had an Oxygen Index (OI) of 26.1 as determined according to the procedure described in ASTMD-2863-74, "Flammability of Plastics Using the Oxygen Index Method". By this method, material samples, which are 6 × 2 × 0.01 to 0.03, are held in a U-shaped frame and the burning of the samples under a specific set of conditions is measured. (This technique measures the lowest oxygen concentration in an atmosphere which will just prevent sustained burning of a top-ignited sample. See Fenimore et al, *Combustion and Flame*, 10, 135 (1966).) The oxygen index values also have been related to the temperature at which a mixture of fuel and a controlled flow of oxygen will just burn when the fuel is composed of volatile pyrolytic products or fragments. See Johnson et al, *Rubber Age*, 107 (No. 5), 29 (1975). Analysis: Calculated (percent) for homopolymer of $[NP(OC_6H_4-3-N(C_2H_5)_2)_2]_n$: C, 64.31; H, 7.57; N, 11.25; P, 8.29. Found (percent): C, 62.08; H, 7.70; N, 10.85; P, 8.12.

EXAMPLE 3

Preparation of $[NP(OC_6H_4-3-N(CH_3)_2)(OC_6H_5)]_n$

The procedure of Example 2 was followed, except that 0.47 equivalents of poly(dichlorophosphazene) were added to 0.56 equivalents of $NaOC_6H_5$ and 0.56 equivalents of $NaOC_6H_4-3-N(CH_3)_2$.

The resulting product (31 percent yield) was an off-white, fibrous solid having a glass transition temperature of 0.0° C. The copolymer was soluble in benzene, toluene, tetrahydroufuran, and dimethylformamide. Films of this material do not burn and are water resistant. Analysis: Calculated (percent) for copolymer of $[NP(OC_6H_4-3-N(CH_3)_2)(OC_6H_5)]_n$: C, 61.30; H, 5.52; N, 10.22; P, 11.29. Found (percent): C, 61.16; H, 5.49; N, 10.09; P, 11.40.

EXAMPLE 4

Preparation of $[NP(OC_6H_4-3-N(C_2H_5)_2)(OC_6H_4-4-Cl)]_n$

The procedure of Example 2 was followed, except that 0.47 equivalents of poly(dichlorophosphazene) were added to 0.56 equivalents of $NaOC_6H_4-4-Cl$ and 0.56 equivalents of $NaOC_6H_4-3-N(C_2H_5)_2$.

The resulting product (47 percent yield) was a brown, tough elastomeric solid having a glass transition temperature of $-4.9°$ C. The copolymer was soluble in benzene, toluene, tetrahydrofuran, and dimethylformamide. Gel Permeation Chromatography indicated that the copolymer had an Mw = 811,000. Films of this material did not burn and were water resistant. Analysis: Calculated (percent) for copolymer of $[NP(OC_6H_4-3-N(C_2H_5)_2)(OC_6H_4-4-Cl)]_n$: C, 57,06; H, 5.40; N, 8.32; P, 9.20. Found (percent): C, 56.84; H, 5.20; N, 8.12; P, 9.26.

EXAMPLE 5

Preparation of $[NP(OC_6H_4-3-N(CH_3)_2)(OC_6H_4-4-OCH_3)]_n$

The prodcedure of Example 2 was followed, except that 0.47 equivalents of poly(dichlorophosphazene) were added to 0.56 equivalents of $NaOC_6H_4-4-OCH_3$ and 0.56 equivalents of $NaOC_6H_4-3-N(CH_3)_2$.

The resulting product (31 percent yield) was a dark brown plastic solid having a glass transition temperature of $+7.5°$ C. The copolymer was soluble in benzene, toluene, tetrahydrofuran, and dimethylformamide. Films of this material had an oxygen index of 25.1 and were water resistant. Analysis: Calculated (percent) for copolymer of $[NP(OC_6H_4-3-N(CH_3)_2)(OC_6H_4-4-OCH_3)]_n$: C, 59.21; H, 5.63; N, 9.21; P, 10.18. Found (percent): C, 59.14; H, 5.58; N, 9.06; P, 10.20.

EXAMPLE 6

Preparation of $[NP(OC_6H_4-3-N(C_2H_5)_2)(OC_6H_4-4-isoC_3H_7)]_n$

The procedure of Example 2 was followed, except that 0.47 equivalents of poly(dichlorophosphazene) were added to 0.56 equivalents of $NaOC_6H_4-4-OCH_3$ and 0.56 equivalents of $NaOC_6H_4-3-N(C_2H_5)_2$.

The resulting product (38 percent yield) was a tan, elastomeric solid having a glass transition temperature of $-1.5°$ C. the copolymer was soluble in benzene, toluene, tetrahydrofuran, and dimethylformamide. Films of this material had an oxygen index of 22.8 and were water resistant. Analysis: Calculated (percent) of copolymer of $[NP(OC_6H_4-3-N(C_2H_5)_2)(OC_6H_4-4-isoC_3H_7)]_n$: C, 66.26; H, 7.32; N, 8.13; P, 8.99. Found (percent): C, 65.76; H, 7.28; N, 7.84; P, 8.68.

EXAMPLE 7

Preparation of
[N₃P₃(OC₆H₄—3—N(CH₃)₂)₂(OC₆H₅)₂(OC₆H₄—4—isoC₃H₇)₂]ₙ

The procedure of Example 2 was followed, except that 0.47 equivalents of poly(dichlorophosphazene) were added to 0.37 equivalents of NaOC₆H₅, 0.37 equivalents of NaOC₆H₄-4-isoC₃H₇, and 0.37 equivalents of NaOC₆H₄—3-N(CH₃)₂.

The resulting product (35 percent yield) was a light brown, elastomeric solid having a glass transition temperature of −2.0° C. The copolymer was soluble in benzene, toluene, tetrahydrofuran and dimethylformamide. Films of this material had an oxygen index of 29.1 and were water resistant. Analysis: Calculated (percent for terpolymer of [N₃P₃(OC₆H₄-3-N(C₂H₅)₂)₂(OC₆H₅)₂(OC₆H₄-4-isoC₃H₇)₂]ₙ: C, 63.95; H, 6.08; N, 8.11; P, 10.75. Found (percent): C, 63.82; H, 6.03; N, 8.00; P, 10.80.

EXAMPLE 8

Preparation of [NP(OC₆H₄-3-N)CH₃)₂)₀.₂(OC₆H₅)₁.₈]ₙ

The procedure of Example 2 was followed, except that 0.92 equivalents of poly(dichlorophosphazene) were added to 1.99 equivalents of NaOC₆H₅ and 0.22 equivalents of NaOC₆H₄-3-N(CH₃)₂.

The resulting product (19 percent yield) was a tan fibrous solid which was soluble in benzene, toluene, tetrahydrofuran, and dimethylformamide. Films do not burn and are water resistant.

Preparation of Hydrochloride Salts of Poly(dialkylaminoarycoxyphosphazenes

Hydrochloride salts of the poly(dialkylaminoaryloxyphosphazenes) were prepared by treating 10 g of the appropriate polymer with an excess of aqueous 5% hydrochloric acid. The polymer slowly dissolved and formed a dark brown solution. Addition of an excess of 5% sodium hydroxide resulted in the precipitation of the original polymer. This could be redissolved by the addition of 5% hydrochloric acid. Evaporation of the solution yielded brown, transparent films of the hydrochloride salts of the poly(dialkylaminoaryloxyphosphazenes). Polymer hydrochloride salts prepared by this method and their glass transition temperatures are listed in the following table.

Hydrochloride Salts and Their Glass Transition Temperatures

| Example | Polymer | Tg, ° C.* |
|---|---|---|
| 9 | [NP(OC₆H₄-3-NH(C₂H₅)₂)₂]ₙ⁺Cl₂ₙ⁻ | +68 |
| 10 | [NP(OC₆H₄-3-NH(C₂H₅)₂)(OC₆H₄-4-Cl]ₙ⁺Clₙ⁻ | 0 |
| 11 | [NP(OC₆H₄-3-NH(CH₃)₂)(OC₆H₅)]ₙ⁺Clₙ⁻ | +22 |

*Determined by differential scanning calorimetry. The above values are based on Indium Standard (melt temperature 156.6° C.).

EXAMPLE 12

Preparation of Foamed
[NP(OC₆H₄-3-N(C₂H₅)₂)(OC₆H₄-4-isoC₃H₇)]ₙ

To 100 parts of the copolymer prepared in accordance with Example 6, there were added 90 parts of alumina trihydrate, 5 parts of magnesium oxide, 10 parts of zinc stearate, 2 parts of CUMAR P-10 (pcoumarone-indene resin), 20 parts of Celogen AZ (1,1′ azobisformamide), 5 parts of BIK-OT (an oil treated urea) as an activator, 6 parts of 2,5-dimethyl-2,5-di(t-butyl peroxy)-hexane, 2 parts of benzoyl peroxide (78% active), and 1 part of dicumyl peroxide. The above ingredients were milled to insure homogeneous mixing of all materials and were then precured in an open sided mold for 5 minutes at 230° F. under 2000 psi. The precured copolymer was then free expanded in a circulating air oven for 30 minutes at 300° F. The resultant foam was brown in color and semirigid, having an oxygen index of 40.2 and a foam density of 28.7 pounds/ft.³.

What is claimed is:

1. Poly(dialkylaminoaryloxyphosphazenes) having the formula:

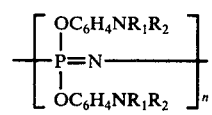

wherein R₁ and R₂ are the same or different and are C₁ to C₁₀ linear or branched alkyl, the radical —NR₁R₂ substituted on the meta or para position of the phenoxy radical and n is from 20 to 2000.

2. The polymer is accordance with claim 1 additionally comprising

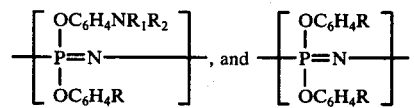

wherein R represents hydrogen, halogen, C₁ to C₁₀ linear or branched alkyl, C₁ to C₄ linear or branched alkoxy or mixtures thereof.

3. The polymer in accordance with claim 1 wherein R₁ and R₂ are the same and are C₁ to C₄ linear or branched alkyl.

4. The process of curing the polymers in accordance with claim 1 which comprises heating said polymers at a temperature ranging from 200°-350° F., utilizing peroxide-type curing agents.

5. The polymer of claim 1 cured with peroxide-type curing agents that are diacyl peroxides, peroxy esters or dialkyl peroxides.

6. The process of curing the polymers in accordance with claim 2 which comprises heating said polymers at a temperature ranging from 200°-350° F., utilizing peroxide-type curing agents.

7. The polymer of claim 2 cured with peroxide-type curing agents.

8. The water-soluble salts of the polymer in accordance with claim 1.

9. The water-soluble salts of the polymer of claim 2 wherein at least 10% of said polymer is dialkylaminoaryloxyphosphazene segments.

10. Poly(dialkylaminophosphazene) polymers having the formula:

wherein R₁ and R₂ are the same or different and are C₁ and C₁₀ linear or branched alkyl, the radical —NR₁R₂ substituted on the meta or para position of the phenoxy radical, R′ and R″ are different and are hydrogen, halogen, C₁ to C₁₀ linear or branched alkyl radical or C₁ to C₄ linear or branched alkoxy, x is greater than 0, when $y$ is $\geq 0$, when $y$ is greater than 0 $x + y = 2$ and $n$ is from 20 to 2000.

11. The polymers in accordance with claim 10 wherein $R_1$ and $R_2$ are $C_1$ and $C_4$ linear or branched alkyl.

12. The process of foaming the polymers of claim 1 which comprises mixing said polymer with a chemical blowing agent and heating the mixture to a temperature sufficient to decompose said blowing agent.

13. The process of claim 12 wherein said blowing agent is 1,1'-azobisformamide.

14. The process of foaming the polymers of claim 2 which comprises mixing said polymers with a chemical blowing agent and heating the mixture to a temperature sufficient to decompose said blowing agent.

15. The process of claim 14 wherein said blowing agent is 1,1'-azobisformamide.

16. A foamed poly(dialkylaminoaryloxyphosphazene) polymer having the formula:

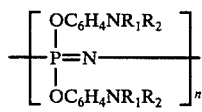

wherein $R_1$ and $R_2$ are the same or different and are $C_1$ and $C_{10}$ linear or branched alkyl, the radical $-NR_1R_2$ substituted on the meta or para position of the phenoxy radical and $n$ is from 20 to 2000.

17. A foamed polymer in accordance with claim 16 additionally comprising

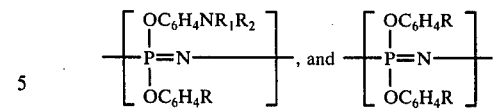

wherein R represents hydrogen, halogen, $C_1$ to $C_{10}$ linear or branched alkyl, $C_1$ to $C_4$ linear or branched alkoxy or mixtures thereof.

18. The process of foaming the copolymers of claim 2 which comprises mixing the copolymers with a chemical blowing agent and a mixture of curing agents, at least one of said curing agents having an initiation temperature below the temperature at which said chemical blowing agent decomposes; heating the foamable mass to a temperature below the decomposition temperature of said blowing agent, but above the initiation temperature of at least one of said curing agents, for a sufficient time to partially precure the copolymers; and heating the partially precured mass to a temperature above the decomposition temperature of said blowing agent to foam the copolymers and to effect a further cure thereof.

19. The process of claim 18, wherein the partial precure is accomplished by heating the foamable mass for about 6 to about 30 minutes at a temperature of from about 200° to about 250° C., and the foaming and further curing is accomplished by heating the partially precured mass for about 30 to about 60 minutes at a temperature of from about 300° to about 350° F.

* * * * *

UNITED STATES PATENT AND TRADEMARK OFFICE
CERTIFICATE OF CORRECTION

PATENT NO. : 4,055,523

DATED : October 25, 1977

INVENTOR(S) : Ronald L. Dieck et al

It is certified that error appears in the above-identified patent and that said Letters Patent are hereby corrected as shown below:

In the Specification: Column 1, line 8, the word "polymer" should read --polymers--. Column 4, line 27, the words "with alkali" should read --with the alkali--. Column 5, line 35, "sodium p-n-butyoxyphenoxide" should read --sodium p-n-butoxyphenoxide--. Column 9, line 5, the word "for" should read --of--; line 35, the word "precipitate" should read --precipitated--. Column 10, line 65, the word "of" should read --for--. Column 11, line 34, the word "Poly(dialkylaminoarycoxyphosphazenes" should read --Poly(dialkylaminoaryloxyphosphazenes)--; line 65, "(pcoumarone-" should read --(p-coumarone---.

In the Claims: Claim 2, column 12, line 24, the word "is" should read --in--. Claim 10, column 12, line 64, "and $C_{10}$" should read --to $C_{10}$--; same claim, column 13, line 1, "than 0" should read --than 0,--. Claim 11, column 13, line 4, "$C_1$ and $C_4$" should read --$C_1$ to $C_4$--. Claim 16, line 27, "and $C_{10}$" should read --to $C_{10}$--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks